(12) United States Patent
Ichikawa

(10) Patent No.: US 8,896,434 B2
(45) Date of Patent: Nov. 25, 2014

(54) INDICATION SYSTEM FOR VEHICLE AND VEHICLE HAVING THE SAME

(75) Inventor: Shinji Ichikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 134 days.

(21) Appl. No.: 13/522,574

(22) PCT Filed: Jan. 18, 2010

(86) PCT No.: PCT/JP2010/050478
§ 371 (c)(1),
(2), (4) Date: Jul. 17, 2012

(87) PCT Pub. No.: WO2011/086697
PCT Pub. Date: Jul. 21, 2011

(65) Prior Publication Data
US 2012/0299715 A1 Nov. 29, 2012

(51) Int. Cl.
*B60Q 1/00* (2006.01)
*H02J 7/02* (2006.01)
*B60L 11/12* (2006.01)
*B60L 11/14* (2006.01)
*B60L 11/18* (2006.01)

(52) U.S. Cl.
CPC .............. *H02J 7/027* (2013.01); *B60L 11/123* (2013.01); *B60L 11/14* (2013.01); *B60L 11/1818* (2013.01); *B60L 11/1824* (2013.01); *B60L 11/1846* (2013.01); *B60L 2230/12* (2013.01); *B60L 2250/16* (2013.01); *Y02T 10/6217* (2013.01); *Y02T 10/7005* (2013.01); *Y02T 10/7077* (2013.01); *Y02T 10/7088* (2013.01); *Y02T 90/121* (2013.01); *Y02T 90/14* (2013.01); *Y02T 90/16* (2013.01); *Y02T 90/163* (2013.01); *Y02T 90/169* (2013.01); *Y02T 90/128* (2013.01); *Y04S 30/14* (2013.01)
USPC .......................................... 340/455; 320/109

(58) Field of Classification Search
CPC ..... Y04S 30/12; Y02T 90/169; Y02T 90/128; Y02T 90/16; Y02T 90/163; Y02T 10/7088; B60L 11/1818

USPC ................... 340/455, 636.1; 320/109; 701/22
See application file for complete search history.

(56) References Cited

U.S. PATENT DOCUMENTS 7,999,665 B2 * 8/2011 Chander et al. ............. 340/636.1
2009/0177580 A1 7/2009 Lowenthal et al.
(Continued)

FOREIGN PATENT DOCUMENTS

CN 101395039 A 3/2009
EP 1992524 A1 11/2008
(Continued)

OTHER PUBLICATIONS

International Search Report mailed Mar. 2, 2010 of PCT/JP2010/050478.

*Primary Examiner* — John A Tweel, Jr.
(74) *Attorney, Agent, or Firm* — Kenyon & Kenyon LLP

(57) ABSTRACT

A charging port includes an inlet, a charging-in-progress lamp, and a communication-in-progress lamp. The inlet is configured to be connectable with a charging cable. During external charging by a charger, the charging-in-progress lamp indicates that external charging is being performed. Specifically, while the charging-in-progress lamp receives from a charging ECU a signal which indicates that external charging is being performed, the charging-in-progress lamp is lit. The communication-in-progress lamp is provided adjacently to the charging-in-progress lamp for indicating, while PLC-based communication by means of the charging cable is in progress, that PLC is being performed. Specifically, the communication-in-progress lamp is lit while the communication-in-progress lamp receives from the charging ECU a signal indicating that PLC is being performed.

7 Claims, 11 Drawing Sheets

(56) References Cited

U.S. PATENT DOCUMENTS

| | | |
|---|---|---|
| 2009/0184833 A1 | 7/2009 | Tonegawa et al. |
| 2011/0022256 A1* | 1/2011 | Asada et al. ............. 701/22 |
| 2011/0175569 A1* | 7/2011 | Austin .................... 320/109 |
| 2011/0213656 A1* | 9/2011 | Turner .................... 320/109 |
| 2012/0007554 A1* | 1/2012 | Kanamori et al. ....... 320/109 |
| 2013/0193918 A1* | 8/2013 | Sarkar et al. ............ 320/109 |
| 2013/0219084 A1* | 8/2013 | Wu et al. ................. 710/11 |

FOREIGN PATENT DOCUMENTS

| | | |
|---|---|---|
| JP | 7-87607 A | 3/1995 |
| JP | 9-161898 A | 6/1997 |
| JP | 9-285022 A | 10/1997 |
| JP | 2003-163721 A | 6/2003 |
| JP | 2004-15222 A | 1/2004 |
| JP | 2007-230520 A | 9/2007 |
| JP | 2009-033265 A | 2/2009 |
| JP | 2009-153015 A | 7/2009 |

* cited by examiner

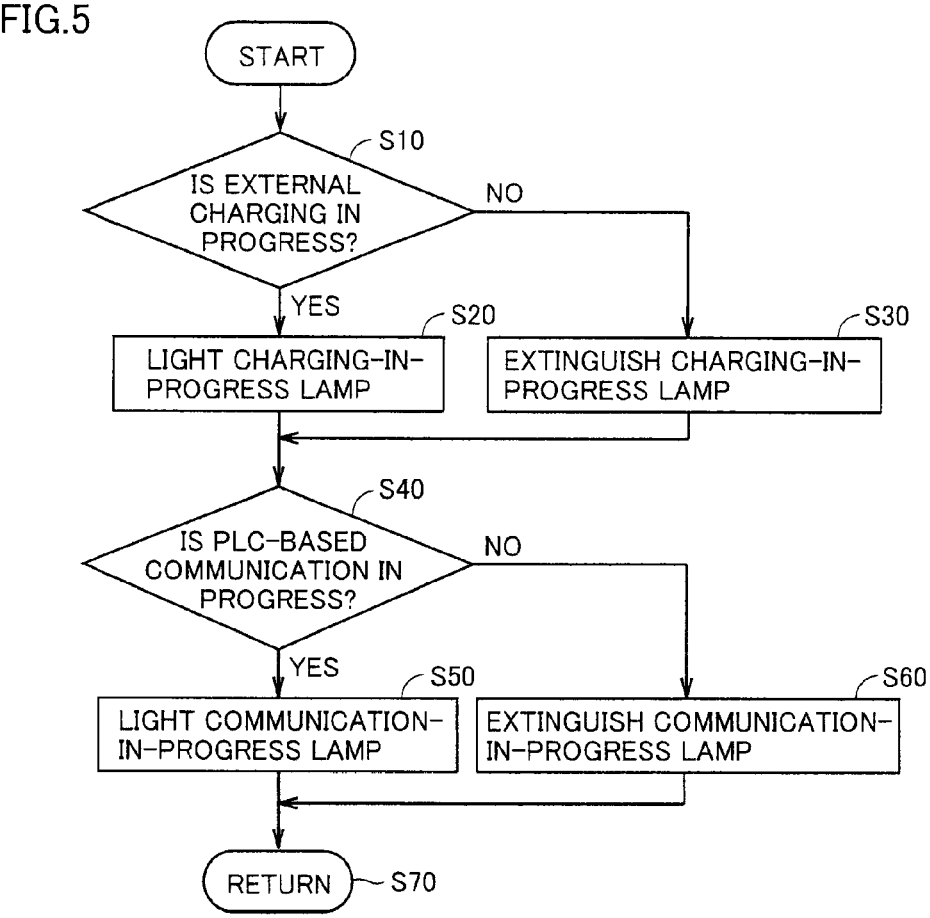
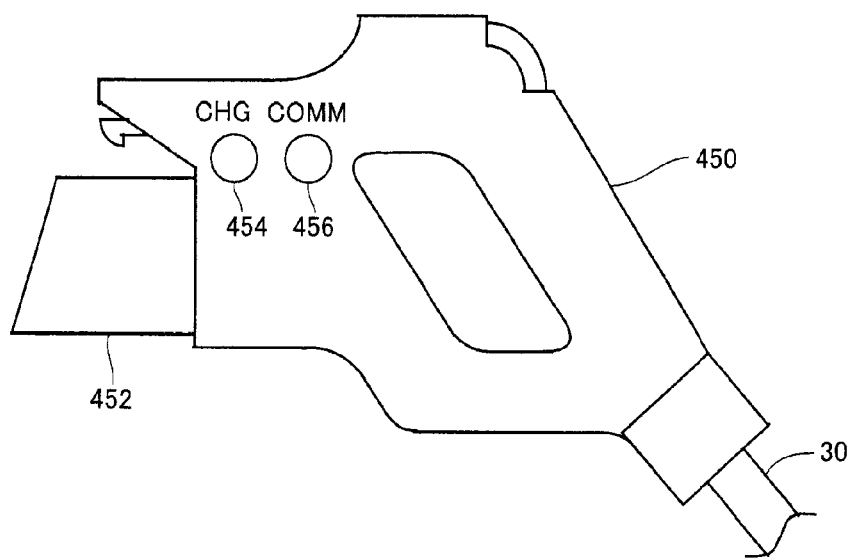

INDICATION SYSTEM FOR VEHICLE AND VEHICLE HAVING THE SAME

This is a 371 national phase application of PCT/JP2010/05478 filed 18 Jan. 2010, the contents of which are incorporated herein by reference.

TECHNICAL FIELD

The present invention relates to an indication system for a vehicle as well as a vehicle having the indication system, and particularly to an indication system for a vehicle that is chargeable by means of a charging cable from a power supply external to the vehicle, as well as a vehicle having the indication system.

BACKGROUND ART

Among vehicles that are chargeable by means of a charging cable from a power supply external to the vehicles, a vehicle is known that is capable of communicating with a device external to the vehicle by using, as a communication channel, a charging port to which a charging cable is connected as well as the charging cable.

For example, Japanese Patent Laying-Open No. 2009-153015 (PTL 1) discloses a power line communication (hereinafter also referred to as "PLC") system using a charging cable. In this PLC system, in response to connection of a plug 20 of the charging cable to a receptacle external to a vehicle, a vehicle-mounted navigation system 15 and a user's personal computer at home are enabled to communicate data through the power line. While data communication is done between the home personal computer and the vehicle-mounted navigation system 15, a notification unit 25 of the plug 20 is controlled by the vehicle-mounted navigation system 15 to indicate the ratio of an amount of data having already been received by the vehicle-mounted navigation system 15.

According to this PLC system, whether or not data transmission between the vehicle-mounted device and the device external to the vehicle is close to completion can easily be confirmed by a user (see PTL 1).

CITATION LIST

Patent Literature

PTL 1: Japanese Patent Laying-Open No. 2009-153015
PTL 2: Japanese Patent Laying-Open No. 2009-33265

SUMMARY OF INVENTION

Technical Problem

When charging of the vehicle capable of performing PLC is completed, there is a possibility that the charging cable is disconnected from the charging port without confirmation of whether or not PLC is in progress. Even if completion of PLC can be confirmed, whether or not the charging cable may be disconnected from the charging port in response to the completion of PLC cannot be determined, unless whether or not charging is in progress can be confirmed at the completion of PLC. Moreover, even while PLC is in progress, there may be the case where the user wants to drive the vehicle by completing PLC depending on the situation where the vehicle is used.

In view of the above, the present invention has been made to solve the problems above. An object of the present invention is, for a vehicle which is chargeable by means of a charging cable from a power supply external to the vehicle and is capable of performing PLC, to appropriately indicate to a user the state where the charging cable is used.

Solution to Problem

According to the present invention, an indication system for a vehicle is an indication system for a vehicle that is chargeable by a power supply external to the vehicle. The vehicle includes a rechargeable power storage device, a charging port, a charger, and a communication unit. The charging port is connectable with a charging cable for supplying, to the vehicle, electric power from the power supply external to the vehicle. The charger receives electric power supplied from the power supply external to the vehicle for charging the power storage device. The communication unit uses the charging port and the charging cable as a communication channel for communicating with a communication device external to the vehicle. The indication system includes first and second indication units. The first indication unit indicates that charging of the power storage device by the charger is in progress. The second indication unit is provided near the first indication unit for indicating that communication with the communication device external to the vehicle by the communication unit is in progress. Preferably, the first and second indication units are provided at the charging port.

Preferably, the first and second indication units are provided at the charging cable.

Preferably, the vehicle further includes a radio communication unit. The radio communication unit communicates by radio with a radio communication device external to the vehicle. The indication system further includes an indication control unit. The indication control unit changes a manner of indication by the second indication unit depending on whether communication by the radio communication unit is possible or not.

Preferably, the first and second indication units are configured by a common indication device. The indication system further includes an indication control unit. The indication control unit changes a manner of indication by the indication device depending on whether charging of the power storage device by the charger is in progress or communication with the communication device external to the vehicle by the communication unit is in progress.

Preferably, the indication system further includes an input unit. The input unit is operable by a user for forcing termination of communication with the communication device external to the vehicle by the communication unit.

More preferably, the indication system further includes a control unit. The control unit terminates charging of the power storage device by the charger in response to operation of the input unit, when a remaining capacity of the power storage device is larger than a predetermined value at the time when the input unit is operated.

Further, according to the present invention, a vehicle includes: a rechargeable power storage device; a charger for charging the power storage device by a power supply external to the vehicle; an electric motor generating drive power for the vehicle to travel, from electric power stored in the power storage device; and any indication system for a vehicle as set forth above.

Advantageous Effects of Invention

According to the present invention, PLC can be performed by means of the charging port and the charging cable. The present invention provides a first indication unit for indicating that charging of the power storage device by the charger is in progress, and a second indication unit provided near the first indication unit for indicating that communication with a communication device external to the vehicle by the communication unit is in progress, and therefore, the state where the charging cable is used can appropriately be indicated to a user.

BRIEF DESCRIPTION OF DRAWINGS

FIG. 5 is a flowchart for illustrating the states of indication by a charging-in-progress lamp and a communication-in-progress lamp.

FIG. 6 is a diagram showing a configuration of a connector portion of a charging cable.

DESCRIPTION OF EMBODIMENTS

Figure 1:
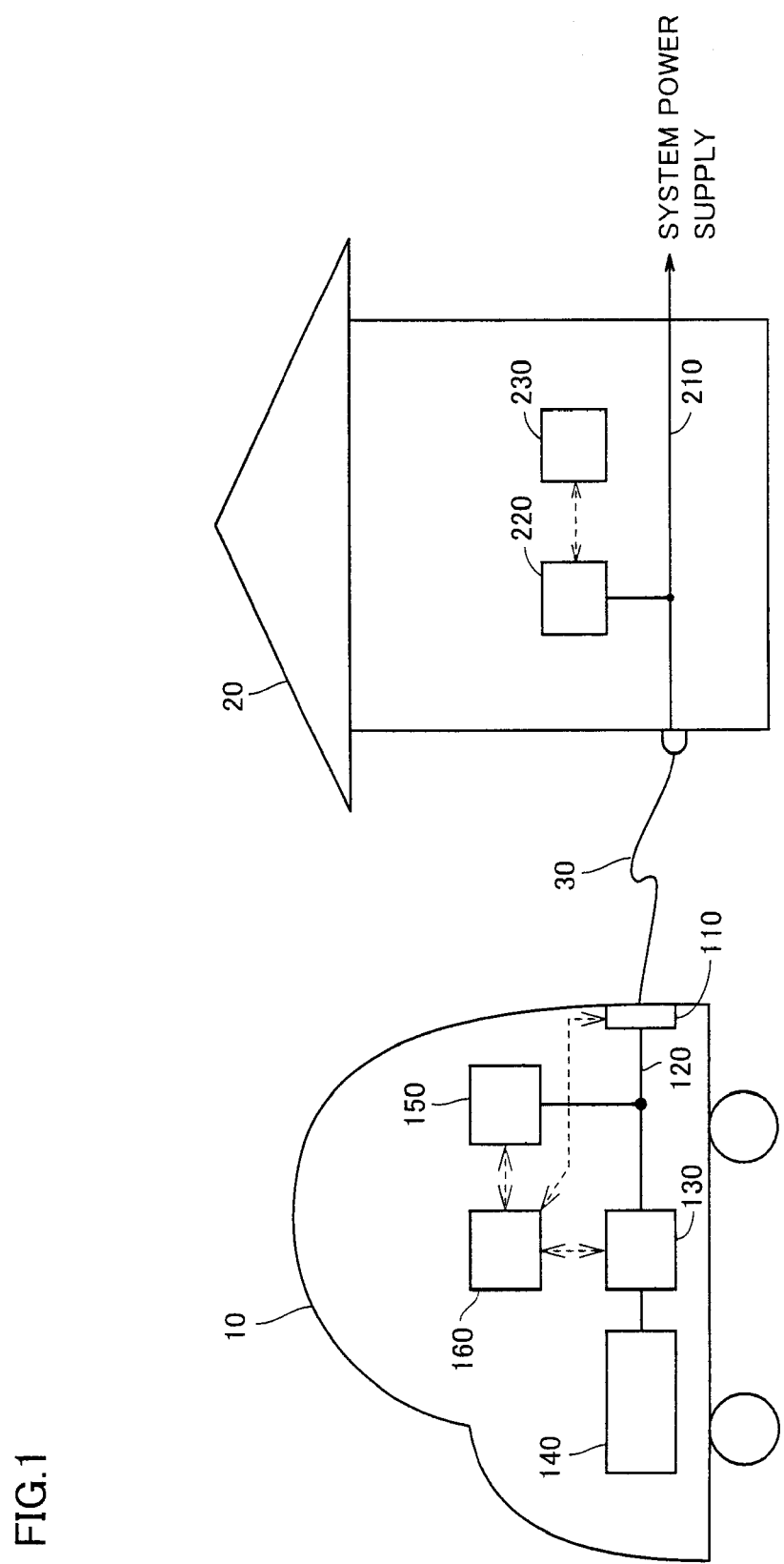
FIG. 1 is an overall configuration diagram of a vehicle charging system to which a vehicle in an embodiment of the present invention is applied.

In the following, embodiments of the present invention will be described in detail with reference to the drawings. In the drawings, the same or corresponding components are denoted by the same reference characters, and a description thereof will not be repeated.

[First Embodiment]

FIG. 1 is an overall configuration diagram of a vehicle charging system to which a vehicle in an embodiment of the present invention is applied. Referring to FIG. 1, this vehicle charging system includes a vehicle 10, a house 20, and a charging cable 30.

In this vehicle charging system, charging cable 30 can be connected between vehicle 10 and a power receptacle of house 20 to thereby charge a power storage device mounted on vehicle 10 from a commercial power supply (system power supply for example). It is noted that charging of vehicle 10 from a power supply (system power supply for example) which is located externally to the vehicle will hereinafter be referred to also as "external charging."

Vehicle 10 includes a charging port 110, an electric power input line 120, a charger 130, a motive power output device 140, a PLC processing unit 150, and a charging ECU (Electronic Control Unit) 160. When external charging is performed, charging cable 30 is connected to charging port 110. This vehicle charging system enables PLC to be performed between vehicle 10 and house 20 through charging port 110 and charging cable 30. Charging port 110 is provided with a charging-in-progress lamp for indicating that external charging is in progress, and a communication-in-progress lamp provided near the charging-in-progress lamp for indicating that PLC-based communication is in progress. Charging port 110 has a configuration described hereinlater in detail.

Charger 130 is connected by electric power input line 120 to charging port 110. Based on a control signal received from charging ECU 160, charger 130 converts electric power which is input from charging port 110 into a predetermined charging voltage, and outputs the converted electric power in voltage to the power storage device (not shown) included in motive power output device 140. Motive power output device 140 outputs drive power for vehicle 10 to travel. When external charging is performed, the power storage device included in motive power output device 140 is charged by charger 130.

PLC processing unit 150 is connected to electric power input line 120. While charging cable 30 is connected to charging port 110, PLC processing unit 150 performs PLC using charging port 110 and charging cable 30 as a communication channel. PLC processing unit 150 is configured by a modem for example. While external charging is performed, PLC processing unit 150 receives, from electric power input line 120, data of a high-frequency signal which is transmitted from a PLC processing unit 220 of house 20 and then demodulates the data, or modulates data to be transmitted to PLC processing unit 220 of house 20 and then outputs the data to electric power input line 120. It is noted that the frequency of AC power which is supplied from the system power supply through charging cable 30 to vehicle 10 is 50 Hz or 60 Hz in Japan for example, and the frequency of the high-frequency signal which is communicated based on PLC through charging cable 30 is for example several MHz to several tens of MHz.

Charging ECU 160 controls external charging by means of charger 130 and controls PLC with an entity external to the vehicle by means of PLC processing unit 150. Specifically, when external charging is performed, charging ECU 160 generates a control signal for driving charger 130 and outputs the generated control signal to charger 130. When charging cable 30 is connected to charging port 110, charging ECU 160 generates a communication command for performing PLC of predetermined communication data between PLC processing unit 150 and PLC processing unit 220 of house 20, and outputs the generated communication command to PLC processing unit 150.

Further, charging ECU 160 generates a signal for indicating, at charging port 110, that external charging by charger 130 is in progress, as well as a signal for indicating, at charging port 110, that PLC is in progress between vehicle 10 and house 20 through charging port 110 and charging cable 30, and outputs the generated signals to charging port 110.

As for house 20, it includes an electric power line 210, PLC processing unit 220, and a communication server 230. Electric power line 210 is connected to the system power supply.

When external charging of vehicle 10 is performed, charging cable 30 is connected to a power receptacle for electric power line 210.

PLC processing unit 220 is connected to electric power line 210. While charging cable 30 is connected between vehicle 10 and house 20, PLC processing unit 220 performs PLC using charging cable 30 and charging port 110 of vehicle 10 as a communication channel. This PLC processing unit 220 is also configured by a modem for example. When external charging is performed, PLC processing unit 220 also receives, from electric power line 210, data of a high-frequency signal which is transmitted from PLC processing unit 150 of vehicle 10 and then demodulates the data, or modulates data to be transmitted to PLC processing unit 150 of vehicle 10 and then outputs the data to electric power line 210.

When PLC is performed, communication server 230 generates a communication command for performing PLC of predetermined communication data between PLC processing unit 220 and PLC processing unit 150 of vehicle 10, and outputs the generated communication command to PLC processing unit 220.

Figure 2:
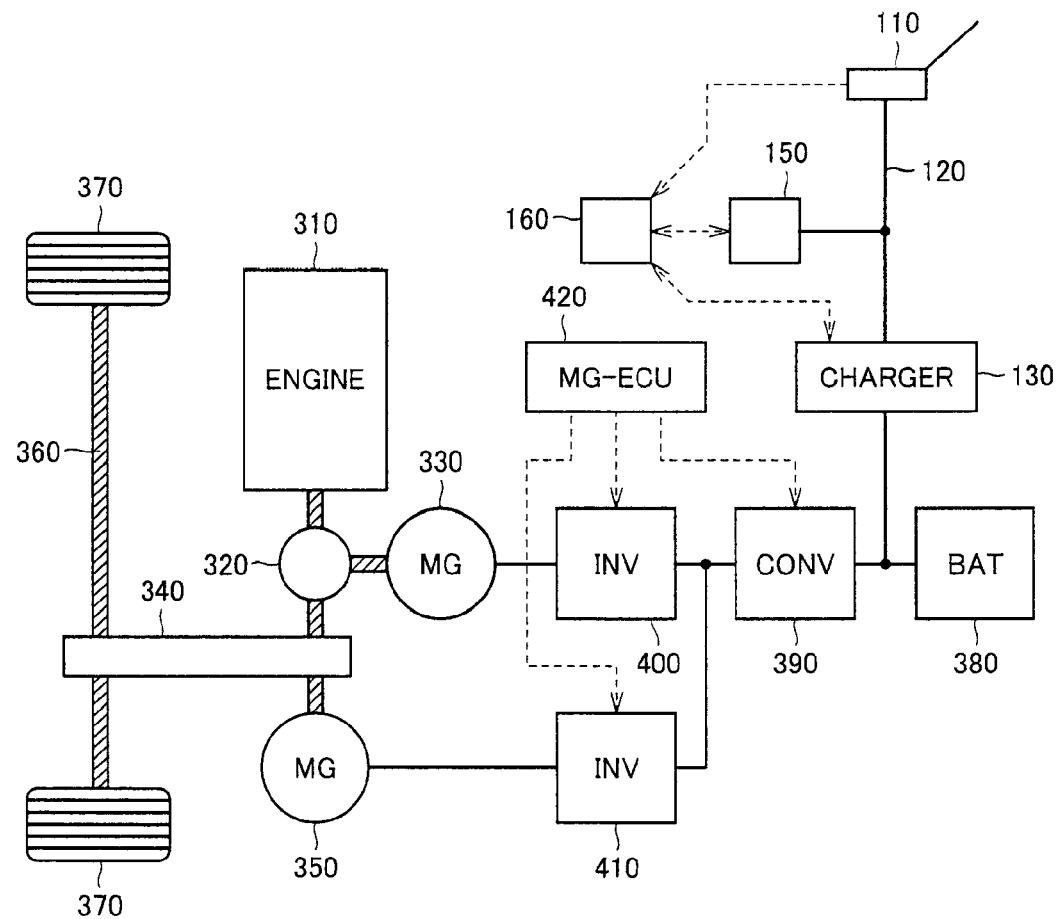
FIG. 2 is an overall block diagram of the vehicle shown in FIG. 1.

FIG. 2 is an overall block diagram of vehicle 10 shown in FIG. 1. FIG. 2 illustrates by way of example the case where vehicle 10 is a hybrid vehicle. Referring to FIG. 2, vehicle 10 includes an engine 310, a power split device 320, motor generators 330, 350, a reduction gear 340, a driveshaft 360, and drive wheels 370. Vehicle 10 also includes a power storage device 380, a boost converter 390, inverters 400, 410, and an MG-ECU 420. Vehicle 10 further includes, as shown in FIG. 1, charging port 110, electric power input line 120, charger 130, PLC processing unit 150, and charging ECU 160.

Engine 310 and motor generators 330, 350 are coupled to power split device 320. Vehicle 10 is caused to travel by drive power from at least one of engine 310 and motor generator 350. Motive power generated by engine 310 is split into two paths by power split device 320. Specifically, one of the paths is used to transmit the motive power through reduction gear 340 to driveshaft 360, and the other thereof is used to transmit the motive power to motor generator 330.

Motor generator 330 is an AC rotating electric machine which is for example a three-phase AC synchronous motor. Motor generator 330 generates electric power by using the motive power of engine 310 split by power split device 320. For example, when the charging state (also referred to as "SOC (State Of Charge)") of power storage device 380 becomes lower than a predetermined value, engine 310 starts and motor generator 330 generates electric power. The electric power generated by motor generator 330 is converted from AC to DC by inverter 400, stepped down by boost converter 390, and stored in power storage device 380.

Motor generator 350 is an AC rotating electric machine which is for example a three-phase AC synchronous motor. Motor generator 350 generates drive power for the vehicle by using at least one of the electric power stored in power storage device 380 and the electric power generated by motor generator 330. The drive power of motor generator 350 is transmitted through reduction gear 340 to driveshaft 360.

It is noted that, when the vehicle is braked, motor generator 350 is driven by using kinetic energy of the vehicle, and motor generator 350 operates as a generator. Thus, motor generator 350 operates as a regenerative brake for converting braking energy into electric power. The electric power generated by motor generator 350 is stored in power storage device 380.

Power split device 320 is formed of a planetary gear train including a sun gear, a pinion gear, a carrier, and a ring gear. The pinion gear meshes with the sun gear and the ring gear. The carrier supports the pinion gear so that the pinion gear is rotatable about its shaft, and is coupled to the crankshaft of engine 310. The sun gear is coupled to a rotation shaft of motor generator 330. The ring gear is coupled to a rotation shaft of motor generator 350 and reduction gear 340.

Power storage device 380 is a rechargeable DC power supply, and is formed of a secondary battery such as nickel-metal hydride or lithium ion battery, for example. In addition to the electric power generated by motor generators 330, 350, electric power supplied from a power supply external to the vehicle and input from charging port 110 during external charging is also stored in power storage device 380. It is noted that a large-capacity capacitor may also be employed as power storage device 380.

Boost converter 390 adjusts a DC voltage to be provided to inverters 400, 410 to be equal to or higher than the voltage of power storage device 380, based on a control signal from MG-ECU 420. Boost converter 390 is configured by a boost chopper circuit, for example.

Inverter 400 converts the electric power generated by motor generator 330 into DC power and outputs the DC power to boost converter 390, based on a control signal from MG-ECU 420. Inverter 410 converts electric power supplied from boost converter 390 into AC power and outputs the AC power to motor generator 350, based on a control signal from MG-ECU 420. It is noted that, when engine 310 is started, inverter 400 converts the electric power supplied from boost converter 390 into AC power and outputs the AC power to motor generator 330. When the vehicle is braked, inverter 410 converts the electric power generated by motor generator 350 into DC power and outputs the DC power to boost converter 390.

MG-ECU 420 generates control signals for driving boost converter 390 and motor generators 330, 350, and outputs the generated control signals to boost converter 390 and inverters 400, 410.

Since charging port 110, electric power input line 120, charger 130, PLC processing unit 150, and charging ECU 160 have been described above in connection with FIG. 1, the description thereof is not repeated here. Charger 130 is connected between power storage device 380 and boost converter 390.

It is noted that engine 310, power split device 320, motor generators 330, 350, reduction gear 340, driveshaft 360, drive wheels 370, power storage device 380, boost converter 390, inverters 400, 410, and MG-ECU 420 constitute motive power output device 140 shown in FIG. 1.

Figure 3:
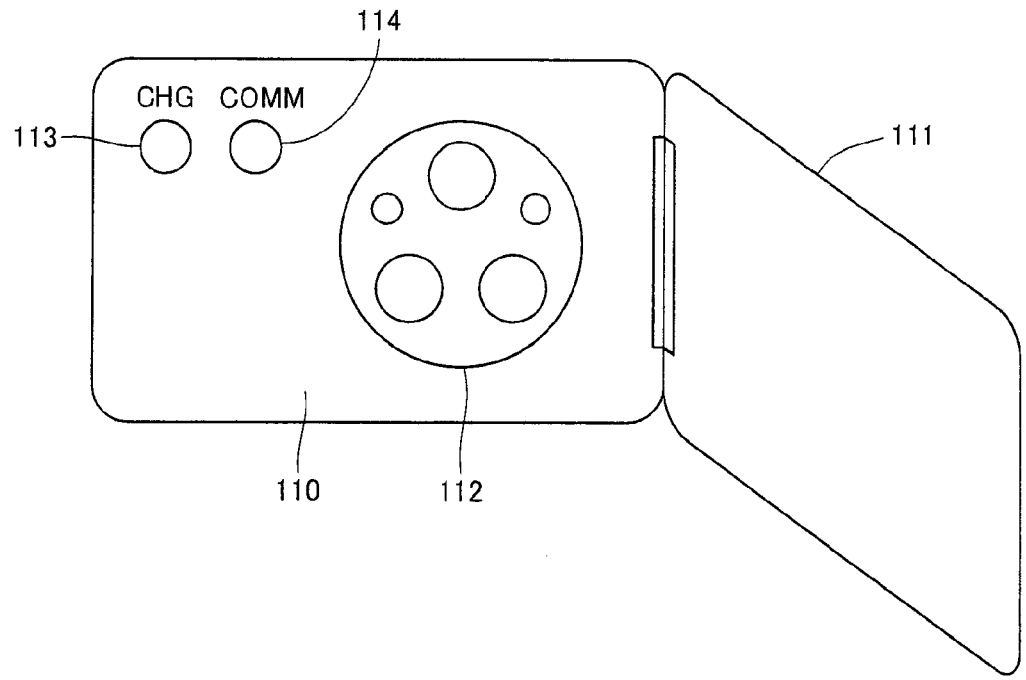
FIG. 3 is a configuration diagram of a charging port shown in FIG. 1.

FIG. 3 is a configuration diagram of charging port 110 shown in FIG. 1.

Referring to FIG. 3, charging port 110 includes a lid 111, an inlet 112, a charging-in-progress lamp 113, and a communication-in-progress lamp 114. Lid 111 is attached in such a manner that enables the lid to be opened and closed by means of a joint such as hinge. Inlet 112 is configured to be connectable with charging cable 30 (FIG. 1). It is noted that, in response to connection of charging cable 30 to inlet 112, a limit switch (not shown) is activated and cable connection signal PISW is output to charging ECU 160 (FIG. 1).

Charging-in-progress lamp 113 indicates, during external charging by charger 130 (FIG. 1), that external charging is being performed. Specifically, charging-in-progress lamp 113 is lit while it receives from charging ECU 160 a signal indicating that external charging is being performed.

Communication-in-progress lamp 114 is placed adjacently to charging-in-progress lamp 113 and, during PLC-based communication by means of charging cable 30, indicates that PLC is being performed. Specifically, communication-inprogress lamp 114 is lit while it receives from charging ECU 160 a signal indicating that PLC is being performed.

It is noted that the arrangement of inlet 112 as well as charging-in-progress lamp 113 and communication-in-progress lamp 114 in charging port 110, and respective shapes of charging-in-progress lamp 113 and communication-in-progress lamp 114 are not limited to the arrangement and the shapes shown in FIG. 3.

Figure 4:
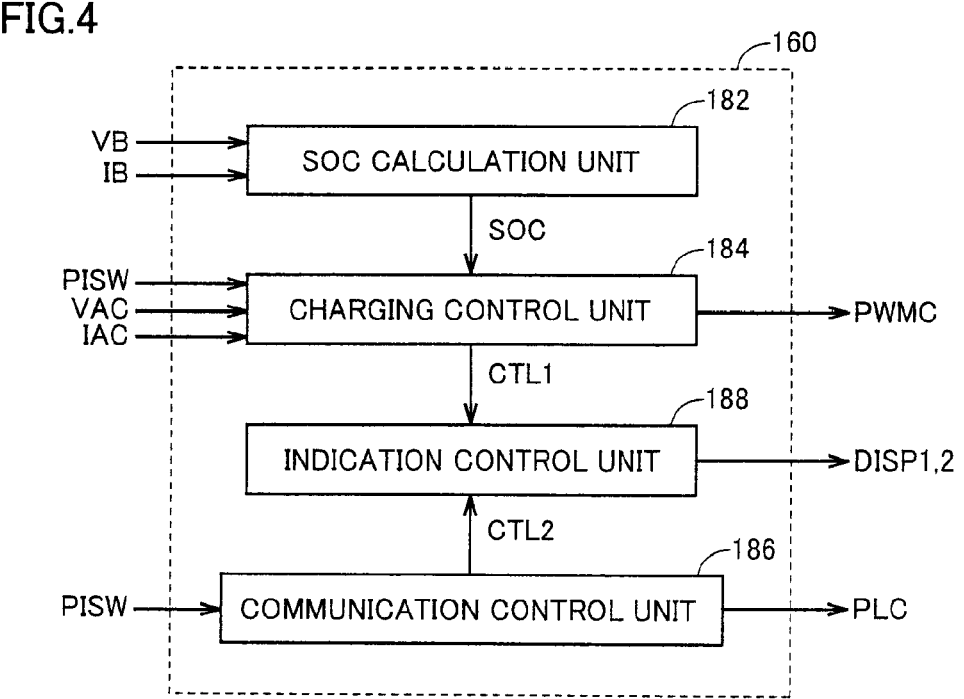
FIG. 4 is a functional block diagram of a charging ECU shown in FIG. 1.

FIG. 4 is a functional block diagram of charging ECU 160 shown in FIG. 1. Referring to FIG. 4, charging ECU 160 includes an SOC calculation unit 182, a charging control unit 184, a communication control unit 186, and an indication control unit 188. SOC calculation unit 182 calculates the SOC of power storage device 380 (FIG. 2) based on respective values of detected voltage VB and current IB of power storage device 380, and outputs the calculated values to charging control unit 184. It is noted that voltage VB and current IB are detected respectively by a voltage sensor and a current sensor (not shown). As to the way to calculate the SOC, any of various known methods may be used.

When it is detected from cable connection signal PISW received from charging port 110 (FIG. 1) that charging cable 30 is connected to charging port 110 and a predetermined charging execution condition is satisfied, charging control unit 184 generates a PWM (Pulse Width Modulation) signal for driving charger 130 (FIG. 1), based on respective values of detected voltage VAC and current IAC of the charging electric power supplied from charging cable 30 as well as the value of the calculated SOC received from SOC calculation unit 182. Then, charging control unit 184 outputs to charger 130 the generated PWM signal as control signal PWMC, and also activates signal CTL1 to be output to indication control unit 188. It is noted that voltage VAC and current IAC are detected respectively by a voltage sensor and a current sensor (not shown).

When it is detected from cable connection signal PISW received from charging port 110 that charging cable 30 is connected to charging port 110 and a predetermined communication execution condition is satisfied, communication control unit 186 generates communication command PLC for performing PLC-based communication of predetermined communication data with house 20. Then, communication control unit 186 outputs the generated communication command PLC to PLC processing unit 150 (FIG. 1) and also activates signal CTL2 to be output to indication control unit 188.

Indication control unit 188 receives signals CTL1 and CTL2 respectively from charging control unit 184 and communication control unit 186. While signal CTL1 is activated, indication control unit 188 generates signal DISP1 indicating that external charging is being performed, and outputs the generated signal to charging port 110. Indication control unit 188 also generates, while signal CTL2 is activated, signal DISP2 indicating that PLC by means of charging cable 30 is being performed, and outputs the generated signal to charging port 110.

FIG. 5 is a flowchart for illustrating the states of indication by charging-in-progress lamp 113 and communication-in-progress lamp 114. Referring to FIG. 5, when external charging by charger 130 is in progress (YES in step S10), signal DISP1 is output from charging ECU 160 to charging port 110 and charging-in-progress lamp 113 is lit (step S20). In contrast, when external charging is not in progress (NO in step S10), charging-in-progress lamp 113 is extinguished (step S30).

When PLC-based communication by means of charging cable 30 is in progress (YES in step S40), signal DISP2 is output from charging ECU 160 to charging port 110 and communication-in-progress lamp 114 is lit (step S50). In contrast, when PLC-based communication is not in progress (NO in step S40), communication-in-progress lamp 114 is extinguished (step S60).

As heretofore described, in the first embodiment, PLC can be carried out by means of charging port 110 and charging cable 30 and, according to the first embodiment, there are provided charging-in-progress lamp 113 for indicating that external charging by charger 130 is in progress as well as communication-in-progress lamp 114 provided in the vicinity of charging-in-progress lamp 113 for indicating that PLC-based communication by means of charging cable 30 is in progress, and therefore, the state where charging cable 30 is used can appropriately be indicated to a user.

[Modification]

According to the description above, charging-in-progress lamp 113 for indicating that external charging is in progress and communication-in-progress lamp 114 for indicating that PLC-based communication is in progress are provided at charging port 110. Alternatively, the charging-in-progress lamp and the communication-in-progress lamp may be provided at charging cable 30.

FIG. 6 is a diagram showing a configuration of a connector portion of charging cable 30. Referring to FIG. 6, connector portion 450 of charging cable 30 includes a connecting portion 452, a charging-in-progress lamp 454, and a communication-in-progress lamp 456. Connecting portion 452 is configured to be connectable with the inlet provided in the charging port of vehicle 10.

Charging-in-progress lamp 454 indicates, during external charging by charger 130 (FIG. 1), that external charging is being performed. Specifically, charging-in-progress lamp 454 is lit while it receives above-described signal DISP1 from charging ECU 160 (FIG. 1) of vehicle 10 through the charging port of vehicle 10 and connecting portion 452.

Communication-in-progress lamp 456 is placed adjacently to charging-in-progress lamp 454 and, during PLC-based communication by means of charging cable 30, indicates that PLC is being performed. Specifically, communication-in-progress lamp 456 is lit while it receives above-described signal DISP2 from charging ECU 160 of vehicle 10 through the charging port of vehicle 10 and connecting portion 452.

As seen from the above, the present modification can also achieve similar effects to those of the above-described first embodiment.

[Second Embodiment]

In this second embodiment, radio communication can be performed in addition to PLC by means of charging cable 30 and, during PLC-based communication, the manner of indication by the communication-in-progress lamp is changed depending on whether radio communication is possible or not. Accordingly, when PLC continues after completion of external charging, for example, it can be determined whether the communication will be broken upon removal of charging cable 30 from the charging port or the communication can be continued by radio communication.

Figure 7:
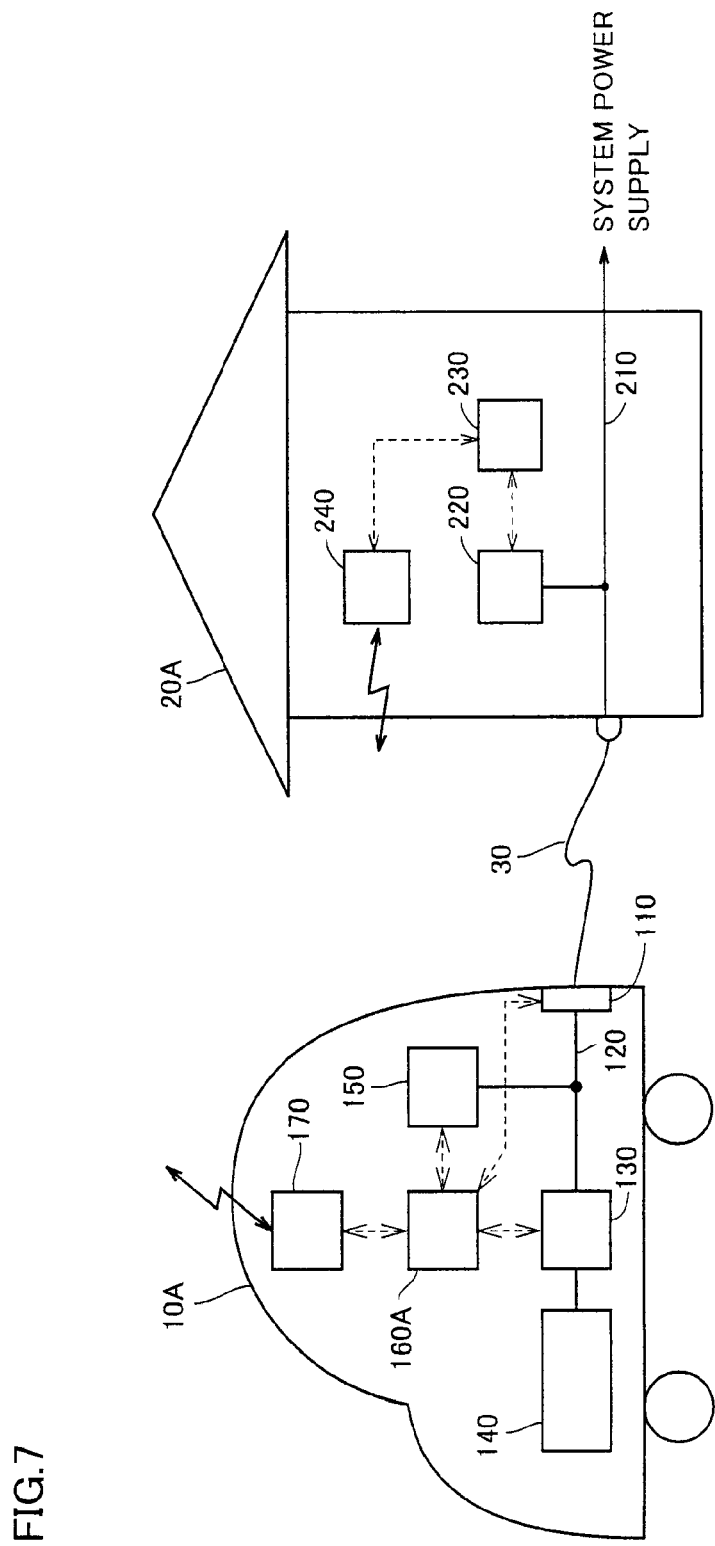
FIG. 7 is an overall configuration diagram of a vehicle charging system in a second embodiment.

FIG. 7 is an overall configuration diagram of a vehicle charging system in the second embodiment. Referring to FIG. 2, this vehicle charging system includes a vehicle 10A, a house 20A, and a charging cable 30.

Vehicle 10A has the configuration of vehicle 10 shown in FIG. 1, further includes a radio communication unit 170, and includes a charging ECU 160A instead of charging ECU 160. Radio communication unit 170 is capable of communicating by radio with a radio communication device which is located externally to the vehicle. For example, radio communication unit 170 can communicate with a radio communication unit 240 provided at house 20A or a radio communication unit (not shown) provided at a dealer or the like. It is noted that a radio standard such as Zigbee®, Bluetooth®, IEEE802.11/a/b/g, or the like may be used, for example.

Charging ECU 160A controls external charging which is performed by means of charger 130 and PLC which is performed with an entity external to the vehicle by means of PLC processing unit 150, and also controls radio communication with an entity external to the vehicle which is performed by means of radio communication unit 170. When charging cable 30 is removed from the charging port during PLC-based communication after completion of external charging, charging ECU 160A generates a radio communication command for performing radio communication and outputs the generated radio communication command to radio communication unit 170 if radio communication by means of radio communication unit 170 is available.

Charging ECU 160A also generates a signal for indicating, at charging port 110, that external charging is in progress, and a signal for indicating, at charging port 110, that PLC-based communication is in progress, and outputs the generated signals to charging port 110. Here, regarding the signal for indicating that PLC-based communication is in progress, charging ECU 160A generates this signal so that the manner of indication is switched depending on whether radio communication by radio communication unit 170 is possible or not.

House 20A has the configuration of house 20 in the first embodiment shown in FIG. 1 and further includes radio communication unit 240. Radio communication unit 240 is capable of communicating by radio with a radio communication device external to the house. For example, it can communicate with radio communication unit 170 mounted on vehicle 10A.

Figure 8:
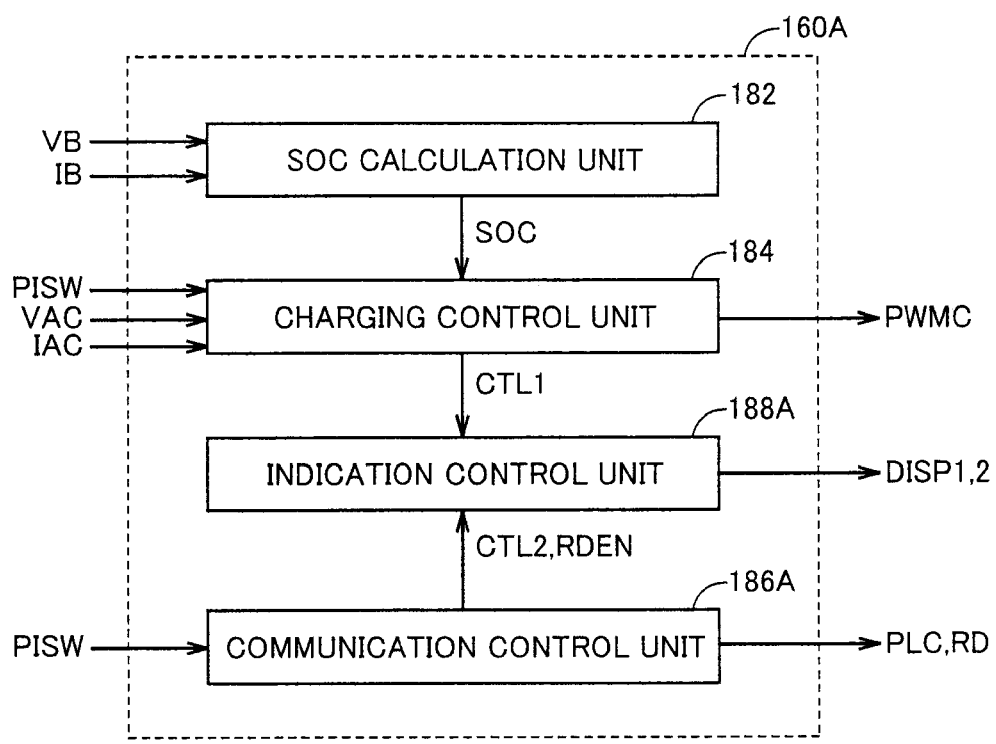
FIG. 8 is a functional block diagram of a charging ECU shown in FIG. 7.

FIG. 8 is a functional block diagram of charging ECU 160A shown in FIG. 7. Referring to FIG. 8, charging ECU 160A has the configuration of charging ECU 160 shown in FIG. 4 and includes a communication control unit 186A and an indication control unit 188A instead of communication control unit 186 and indication control unit 188, respectively.

When it is detected from cable connection signal PISW that charging cable 30 is connected to charging port 110 and a predetermined communication execution condition is satisfied, communication control unit 186A generates communication command PLC for performing PLC-based communication of predetermined communication data with house 20A, outputs the generated communication command PLC to PLC processing unit 150 (FIG. 7), and activates signal CTL2 to be output to indication control unit 188A.

When radio communication by means of radio communication unit 170 is possible, communication control unit 186A also activates signal RDEN to be output to indication control unit 188A. In the case where charging cable 30 is not connected, communication control unit 186A generates radio communication command RD for performing radio communication of communication data with house 20A and outputs the generated command to radio communication unit 170 if there remains data to be communicated and radio communication by means of radio communication unit 170 is possible. It is noted that since charging cable 30 is not connected at this time, signal CTL2 to be output to indication control unit 188A is inactivated.

Based on signal CTL1 received from charging control unit 184, indication control unit 188A generates signal DISP1 for controlling the state of indication by charging-in-progress lamp 113 at charging port 110, and outputs the generated signal DISP1 to charging port 110. When signal CTL2 received from communication control unit 186A is activated, indication control unit 188A causes communication-in-progress lamp 114 at charging port 110 to have a first indication state (to be lit for example). When signal RDEN received from communication control unit 186A is further activated, indication control unit 188A generates signal DISP2 for causing communication-in-progress lamp 144 to have a second indication state (to be flashed for example), and outputs the generated signal DISP2 to charging port 110.

It is noted that other features of the configuration of charging ECU 160A are identical to those of charging ECU 160 shown in FIG. 4.

Figure 9:
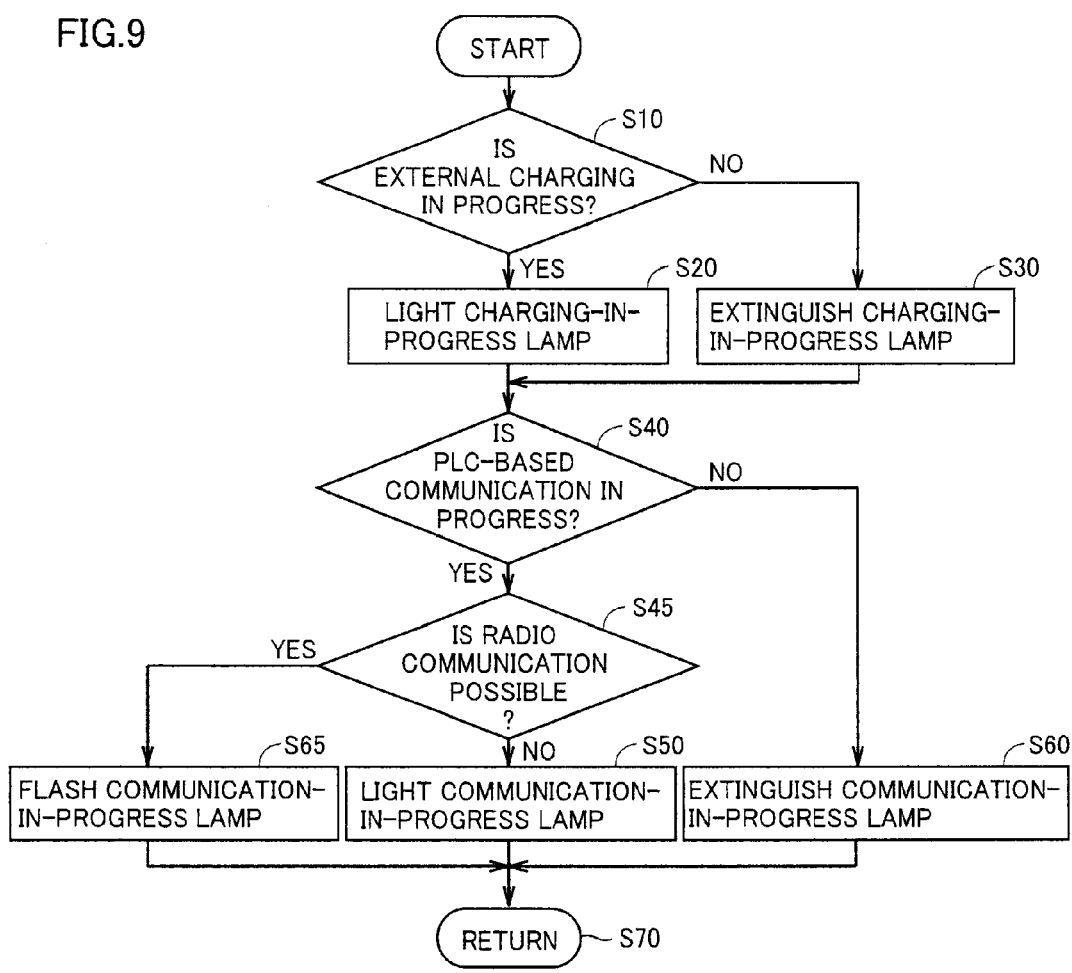
FIG. 9 is a flowchart for illustrating the states of indication by a charging-in-progress lamp and a communication-in-progress lamp in the second embodiment.

FIG. 9 is a flowchart for illustrating the states of indication by charging-in-progress lamp 113 and communication-in-progress lamp 114 in the second embodiment. Referring to FIG. 9, this flowchart further includes steps S45 and S65 in addition to the steps of the flowchart shown in FIG. 5.

Specifically, in the case where PLC-based communication by means of charging cable 30 is in progress (YES in step S40), communication-in-progress lamp 114 is flashed (step S65) if radio communication by radio communication unit 170 is possible (YES in step S45), or communication-in-progress lamp 114 is lit (step S50) if radio communication is not possible (NO in step S45).

As heretofore described, in the second embodiment, in the case where PLC-based communication by means of charging cable 30 is in progress, the manner of indication by communication-in-progress lamp 114 is switched depending on whether radio communication by radio communication unit 170 is possible or not. Therefore, according to the second embodiment, when PLC continues after completion of external charging, for example, a user can determine whether removal of charging cable 30 from charging port 110 will cause the communication to be broken or the communication will be continued by radio communication.

[Third Embodiment]

In the above-described embodiments each, the charging-in-progress lamp and the communication-in-progress lamp are provided separately. In this third embodiment, the indication that external charging is in progress and the indication that PLC-based communication is in progress are provided by one lamp.

Figure 10:
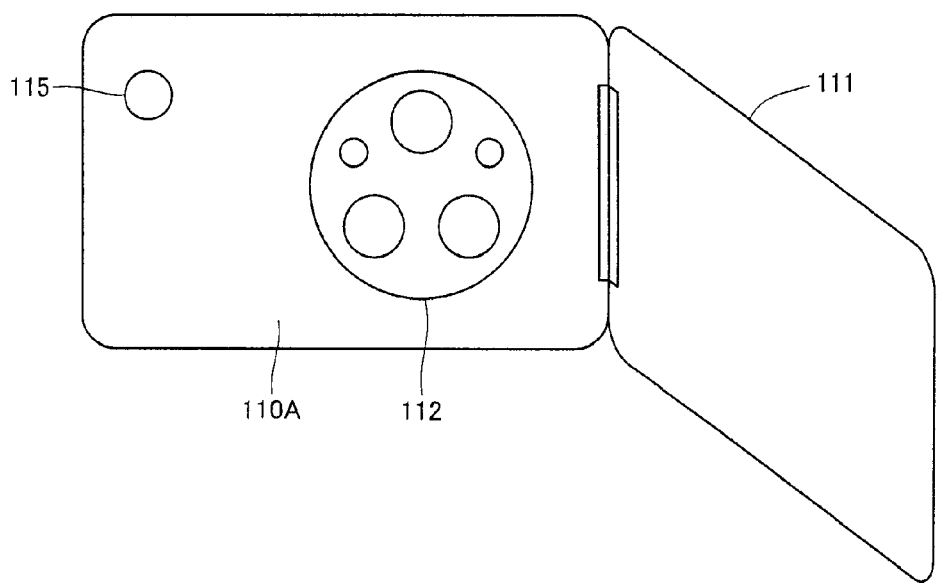
FIG. 10 is a configuration diagram of a charging port in a third embodiment.

FIG. 10 is a configuration diagram of a charging port 110A in the third embodiment. Referring to FIG. 10, charging port 110A has the configuration of charging port 110 shown in FIG. 3 and includes an indication lamp 115 instead of charging-in-progress lamp 113 and communication-in-progress lamp 114.

Based on a signal received from a charging ECU 160B described herein below, indication lamp 115 is lit while external charging by charger 130 (FIG. 1) is in progress and is flashed while external charging is not in progress but PLC-based communication is in progress. While external charging is not in progress and PLC-based communication is also not in progress, indication lamp 115 is extinguished.

Figure 11:
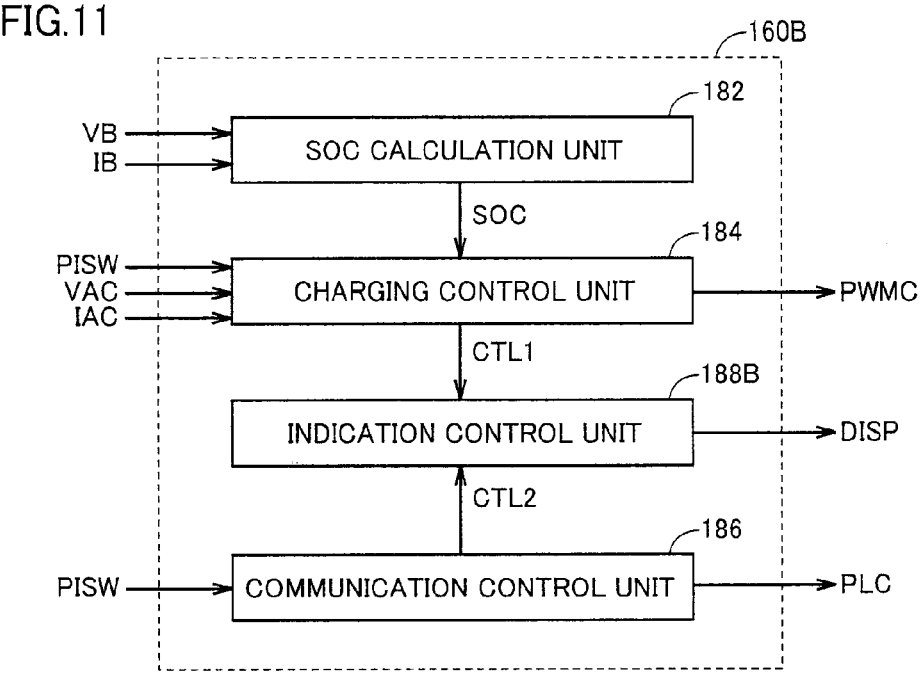
FIG. 11 is a functional block diagram of a charging ECU in the third embodiment.

FIG. 11 is a functional block diagram of charging ECU 160B in the third embodiment. Referring to FIG. 11, charging ECU 160B has the configuration of charging ECU 160 shown in FIG. 4 and includes an indication control unit 188B instead of indication control unit 188.

When signal CTL1 received from charging control unit 184 is being activated, namely external charging is in progress, indication control unit 188B generates signal DISP and outputs the generated signal to charging port 110A so that indication lamp 115 at charging port 110 is lit.

When signal CTL1 is being inactivated and signal CTL2 received from communication control unit 186 is being activated, namely external charging is not in progress but PLC-based communication is in progress, indication control unit 188A generates signal DISP and outputs the generated signal to charging port 110A so that indication lamp 115 at charging port 110 flashes.

Further, when both signals CTL1 and CTL2 are being inactivated, namely external charging is not in progress and PLC-based communication is also not in progress, indication control unit 188A generates signal DISP and outputs the generated signal to charging port 110A so that indication lamp 115 at charging port 110 is extinguished.

It is noted that other functions of charging ECU 160B are identical to those of charging ECU 160 shown in FIG. 4.

Figure 12:
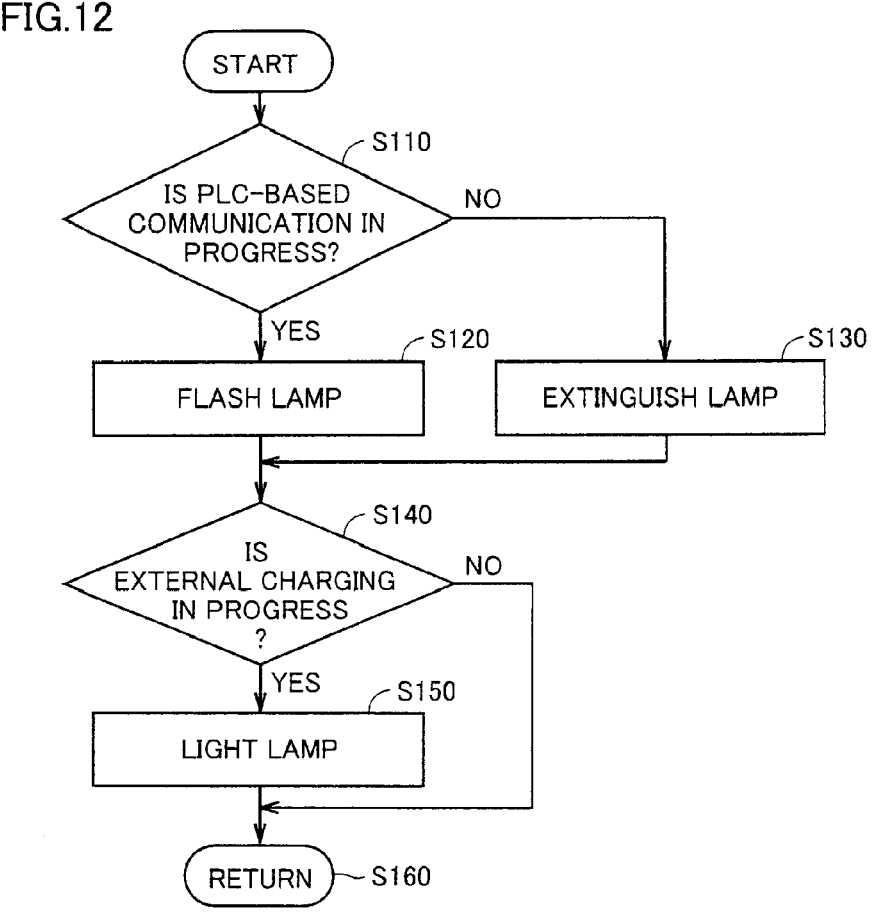
FIG. 12 is a flowchart for illustrating the state of indication by an indication lamp.

FIG. 12 is a flowchart for illustrating the state of indication by indication lamp 115. Referring to FIG. 12, when PLC-based communication by means of charging cable 30 is in progress (YES in step S110), indication lamp 115 flashes (step S120). In contrast, when PLC-based communication is not in progress (NO in step S110), indication lamp 115 is extinguished (step S130).

Subsequently, it is determined whether or not external charging by charger 130 is in progress (step S140). When external charging is in progress (YES in step S140), indication lamp 115 is lit (step S150). In contrast, when external charging is not in progress (NO in step S140), the process proceeds to step S160.

It is noted that, according to the description above, the manner of indication by indication lamp 115 is switched between lighting and flashing of indication lamp 115. Alternatively, the manner of indication by indication lamp 115 may be switched between different colors of indication by indication lamp 115.

Further, as described above in connection with the second embodiment, in the case where radio communication unit 170 is provided, the manner of indication provided when external charging is not in progress but PLC-based communication is in progress (namely the manner of indication in step S120) may further be changed depending on whether radio communication by radio communication unit 170 is possible or not. Namely, depending on whether radio communication by radio communication unit 170 is possible or not, for example, the rate of flashing may be changed or the color of indication may further be changed.

As heretofore described, according to the third embodiment, one indication lamp 115 can be used to appropriately indicate, to a user, the state where charging cable 30 is used.

[Fourth Embodiment]

In this fourth embodiment, when the communication-in-progress lamp or the indication lamp indicates that PLC-based communication is in progress, a user may operate an input unit provided at the charging port to thereby force the PLC to be terminated at the user's will.

Figure 13:
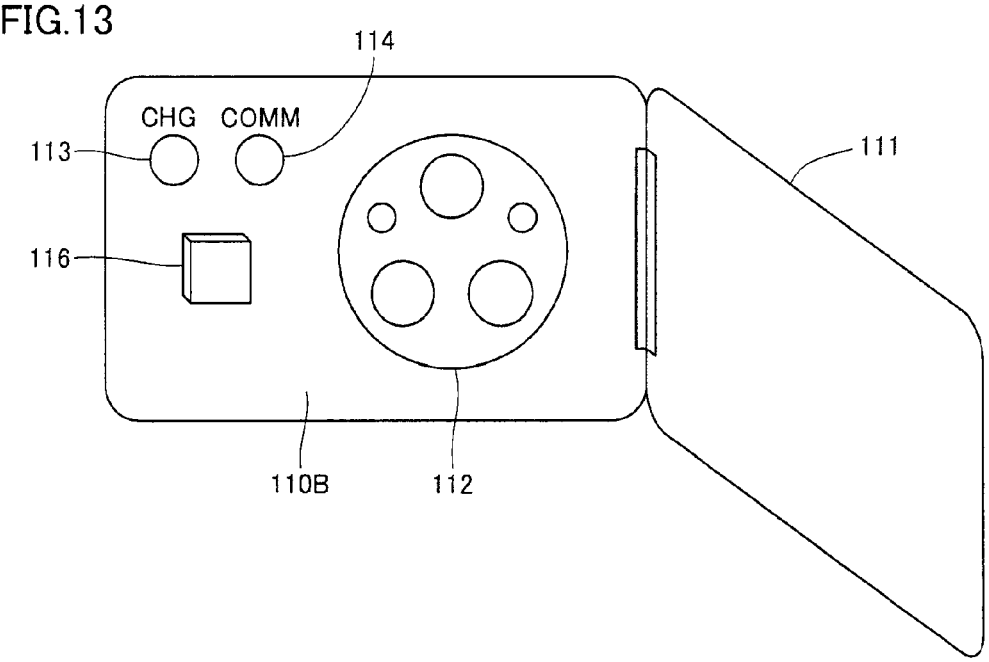
FIG. 13 is a configuration diagram of a charging port in a fourth embodiment.

FIG. 13 is a configuration diagram of a charging port 110B in the fourth embodiment. Referring to FIG. 13, charging port 110B has the configuration of charging port 110 shown in FIG. 3 and further includes an input unit 116. Input unit 116 can be operated by a user and is formed for example of a push button, switch, or the like. When a user operates input unit 116, this is conveyed to a charging ECU 160C described below. At this time, if PLC-based communication is in progress, the communication is forced to be terminated.

Figure 14:
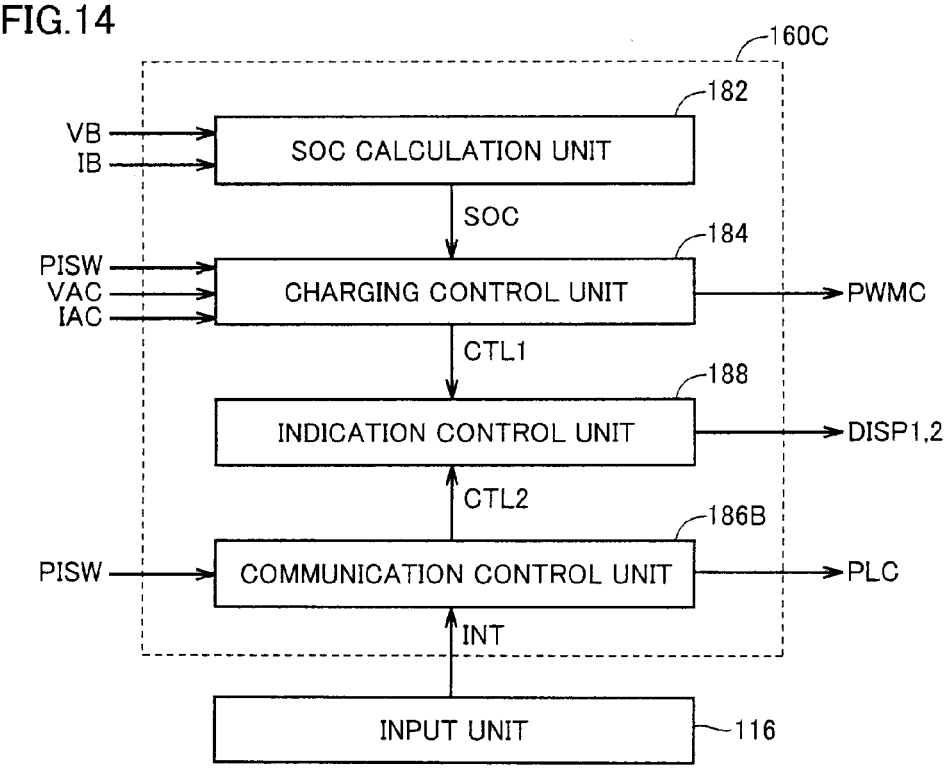
FIG. 14 is a functional block diagram of a charging ECU in the fourth embodiment.

FIG. 14 is a functional block diagram of charging ECU 160C in the fourth embodiment. Referring to FIG. 14, charging ECU 160C has the configuration of charging ECU 160 shown in FIG. 4 and includes a communication control unit 186B instead of communication control unit 186.

When communication control unit 186B receives, from input unit 116, signal INT indicating that input unit 116 has been operated by a user and communication command PLC giving an instruction to perform PLC is output to PLC processing unit 150, communication control unit 186B stops this output of communication command PLC. Then, in response to the stoppage of the output of communication command PLC to PLC processing unit 150, signal CTL2 to be output to indication control unit 188 is also inactivated. Thus, in response to user's operation of input unit 116, PLC is terminated and communication-in-progress lamp 114 at charging port 110B is accordingly extinguished.

It is noted that, when input unit 116 is operated by a user, PLC may not immediately be terminated but be terminated after communication is completed of communication data to which a high predetermined priority is given or after communication is completed of data which was communicated when input unit 116 was operated.

Figure 15:
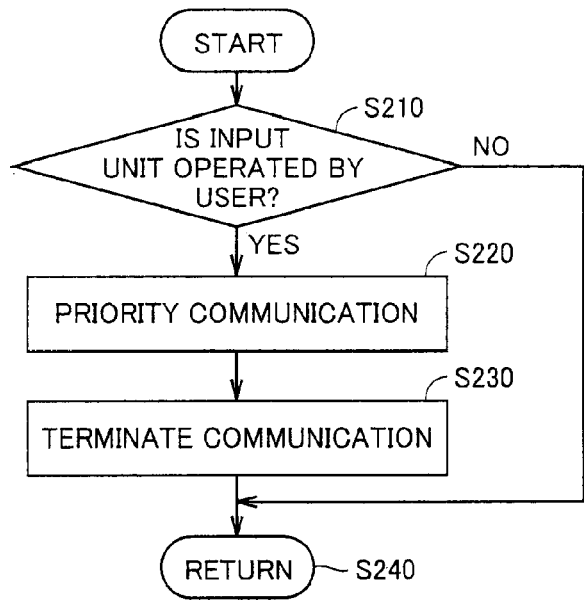
FIG. 15 is a flowchart showing an example of the process performed when a user operates an input unit.

FIG. 15 is a flowchart showing an example of the process performed when input unit 116 is operated by a user. Referring to FIG. 15, when input unit 116 is operated by a user (YES in step S210), priority communication is performed in accordance with a predetermined process (step S220). By this priority communication, only the communication data having a high predetermined priority, the data communicated when input unit 116 was operated, or the like, is communicated as described above. After completion of the priority communication, PLC is terminated (step S230).

As heretofore described, in the fourth embodiment, input unit 116 which can be operated by a user is provided, and therefore, PLC can be forced to be terminated at the user's will. Thus, according to the fourth embodiment, if a user desires to cause the vehicle to travel while PLC continues after completion of external charging, the user can terminate the PLC and cause the vehicle to start traveling.

[Fifth Embodiment]

In this fifth embodiment, PLC is terminated in response to user's operation of input unit 116 and further, when external charging by charger 130 continues and the SOC of power storage device 380 (FIG. 2) is larger than a predetermined value, external charging is also terminated.

Figure 16:
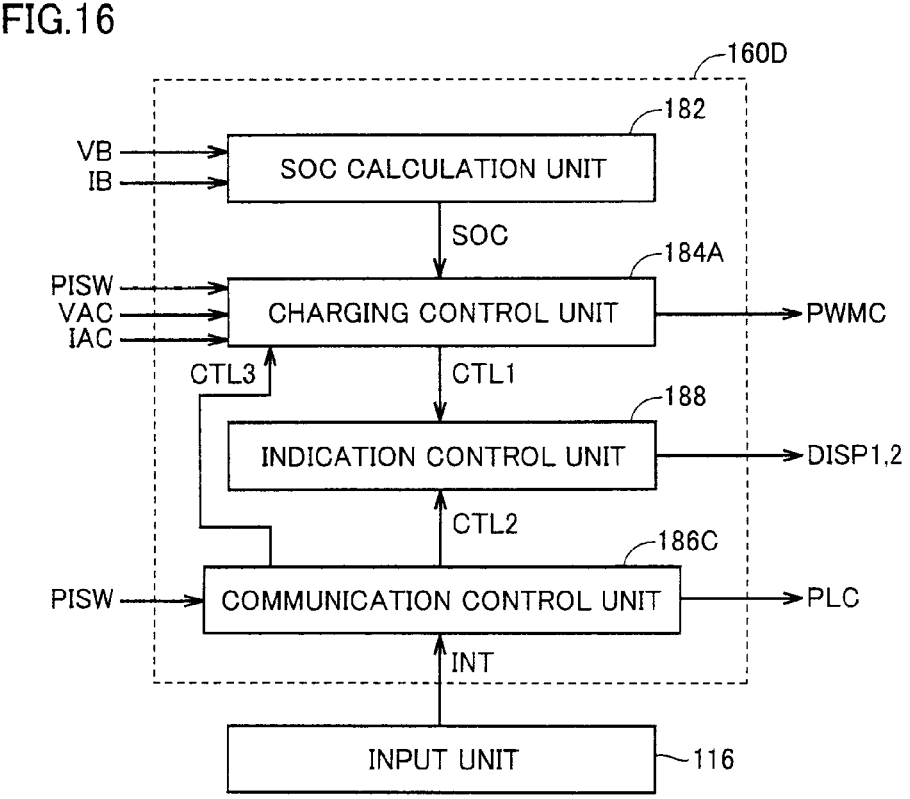
FIG. 16 is a functional block diagram of a charging ECU in a fifth embodiment.

FIG. 16 is a functional block diagram of a charging ECU 160D in the fifth embodiment. Referring to FIG. 16, charging ECU 160D has the configuration of charging ECU 160C of the fourth embodiment shown in FIG. 14 and includes a charging control unit 184A and a communication control unit 186C instead of charging control unit 184 and communication control unit 186B, respectively.

When communication control unit 186C receives, from input unit 116, signal INT indicating that input unit 116 has been operated by a user, communication control unit 186C activates signal CTL3 to be output to charging control unit 184A. It is noted that signal INT may directly be output from input unit 116 to charging control unit 184A. Other functions of communication control unit 186C are identical to those of communication control unit 186B shown in FIG. 14.

When signal CTL3 received from communication control unit 186C is activated and the value of the calculated SOC of power storage device 380 that is received from SOC calculation unit 182 is larger than a predetermined value, charging control unit 184A stops generating control signal PWMC and terminates external charging which is performed by charger 130. It is noted that, when charging control unit 184A stops generating control signal PWMC, charging control unit 184A inactivates signal CTL1 to be output to indication control unit 188. It is noted that other functions of charging control unit 184A are identical to those of charging control unit 184 described in connection with FIG. 4.

Figure 17:
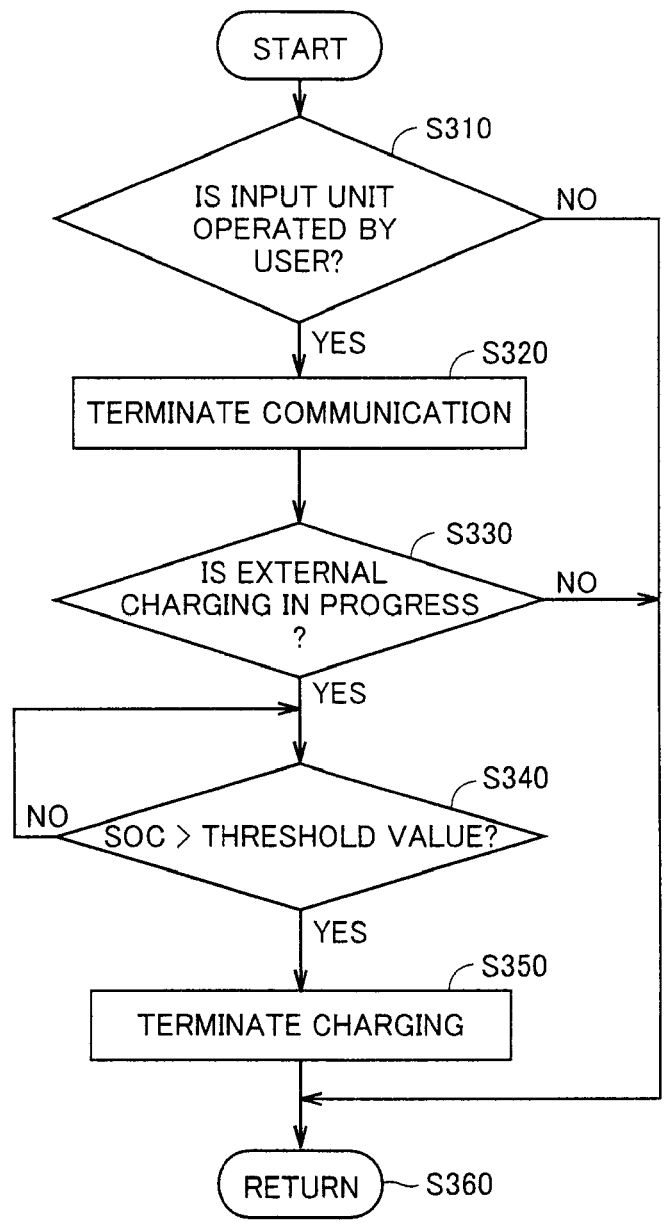
FIG. 17 is a flowchart for illustrating a flow of the process performed when a user operates an input unit in the fifth embodiment.

FIG. 17 is a flowchart for illustrating a flow of the process performed when input unit 116 is operated by a user in the fifth embodiment. Referring to FIG. 17, when input unit 116 is operated by a user (YES in step S310), PLC is terminated (step S320).

Subsequently, it is determined whether or not external charging by charger 130 is in progress (step S330). When external charging is in progress (YES in step S330) and the SOC of power storage device 380 is larger than a predetermined threshold value (YES in step S340), external charging is terminated (step S350).

As heretofore described, in the fifth embodiment, when input unit 116 is operated by a user while external charging and PLC are in progress, PLC is terminated and, after the SOC of power storage device 380 becomes larger than a threshold value, external charging is terminated. Thus, according to the fifth embodiment, the vehicle can be prevented from starting traveling while the state of charge by external charging is insufficient.

In the above-described fourth and fifth embodiments as well, a single lamp may be used like the third embodiment to provide both the indication that external charging is in progress and the indication that PLC-based communication is in progress.

Further, in the above-described second to fifth embodiments as well, the charging-in-progress lamp and the communication-in-progress lamp or the indication lamp may be provided at charging cable 30 like the modification of the first embodiment. Furthermore, in the above-described fourth and fifth embodiments, input unit 116 may be provided at charging cable 30.

In the above-described third embodiment, the manner of indication by indication lamp 115 is changed depending on the states of external charging and PLC. However, indication lamp 115 may be lit when one of external charging and PLC is being performed and indication lamp 115 may be extinguished when both the external charging and the PLC are terminated.

In each of the above-described embodiments, vehicle 10 is connected to a power receptacle of house 20 and charged by the system power supply. The external power supply feeding the charging electric power to vehicle 10, however, is not limited to such a power supply. For example, a distributed power supply installed in house 20 may be used to charge the vehicle, or vehicle 10 may be connected to a dedicated charging station outside the house so that vehicle 10 is charged.

Further, according to the description above, power storage device 380 in vehicle 10 is charged from an external power supply by means of charger 130 which is dedicated to external charging. However, the dedicated charger 130 may not be provided. Specifically, electric power input line 120 connected to charging port 110 may be connected to respective neutral points of motor generators 330, 350 and the voltage between the neutral points may be adjusted by inverters 400, 410 to thereby convert electric power fed from the external power supply into a charging voltage for charging power storage device 380.

Further, according to the description above, vehicle 10 is a hybrid vehicle mounted with engine 310 and motor generator 350 as motive power sources for the vehicle to travel. Applications of the present invention, however, are not limited to the hybrid vehicle and include an electric vehicle without engine, a fuel cell vehicle mounted with a fuel cell as a DC power supply, and the like.

In the description above, PLC processing unit 150 corresponds to an embodiment of "communication unit" of the present invention, charging-in-progress lamp 113 and communication-in-progress lamp 114 correspond to an embodiment of "first indication unit" and an embodiment of "second indication unit" of the present invention, respectively. In addition, charging ECU 160C, 160D correspond to an embodiment of "control unit" of the present invention, and motor generator 350 corresponds to an embodiment of "electric motor" of the present invention.

It should be construed that the embodiments disclosed herein are by way of illustration in all respects, not by way of limitation. It is intended that the scope of the present invention is defined by claims, not by the description above of the embodiments, and encompasses all modifications and variations equivalent in meaning and scope to the claims.

Reference Signs List 10, 10A vehicle; 20, 20A, 30 charging cable; 110, 110A, 110B charging port; 111 lid; 112 inlet; 113, 454 charging-in-progress lamp; 114, 456 communication-in-progress lamp; 115 indication lamp; 116 input unit; 120 electric power input line; 130 charger; 140 motive power output device; 150, 220 PLC processing unit; 160, 160A-160D charging ECU; 170, 240 radio communication unit; 182 SOC calculation unit; 184, 184A charging control unit; 186, 186A-186C communication control unit; 188, 188A, 188B indication control unit; 210 electric power line; 230 communication server; 310 engine; 320 power split device; 330, 350 motor generator; 340 reduction gear; 360 driveshaft; 370 drive wheel; 380 power storage device; 390 boost converter; 400, 410 inverter; 420 MG-ECU; 450 connector portion; 452 connecting portion

The invention claimed is:

1. An indication system for a vehicle chargeable by a power supply external to the vehicle,
   said vehicle including:
      a rechargeable power storage device;
      a charging port connectable with a charging cable for supplying electric power from said power supply to said vehicle;
      a charger receiving electric power supplied from said power supply for charging said power storage device; and
      a communication unit using said charging port and said charging cable as a communication channel for communicating with a communication device external to the vehicle, and
   said indication system comprising:
      a first indication unit for indicating that charging of said power storage device by said charger is in progress; and
      a second indication unit provided near said first indication unit for indicating that communication with said communication device external to the vehicle by said communication unit is in progress,
   said vehicle further includes a radio communication unit for communicating by radio with a radio communication device external to the vehicle, and
   said indication system further comprises an indication control unit for changing a manner of indication by said second indication unit depending on whether communication by said radio communication unit is possible or not.

2. The indication system for a vehicle according to claim 1, wherein said first and second indication units are provided at said charging port.

3. The indication system for a vehicle according to claim 1, wherein said first and second indication units are provided at said charging cable.

4. The indication system for a vehicle according to claim 1, wherein
said first and second indication units are configured by a common indication device, and
said indication system further comprises an indication control unit for changing a manner of indication by said indication device depending on whether charging of said power storage device by said charger is in progress or communication with said communication device external to the vehicle by said communication unit is in progress.

5. The indication system for a vehicle according to claim 1, further comprising an input unit operable by a user for forcing termination of communication with said communication device external to the vehicle by said communication unit.

6. The indication system for a vehicle according to claim 5, further comprising a control unit for terminating charging of said power storage device by said charger in response to operation of said input unit, when a remaining capacity of said power storage device is larger than a predetermined value at the time when said input unit is operated.

7. A vehicle comprising:
a rechargeable power storage device;
a charger for charging said power storage device by a power supply external to the vehicle;
an electric motor generating drive power for the vehicle to travel, from electric power stored in said power storage device; and
an indication system for a vehicle, the indication system further comprising:
a first indication unit for indicating that charging of said power storage device by said charger is in progress; and
a second indication unit provided near said first indication unit for indicating that communication with said communication device external to the vehicle by said communication unit is in progress,
said vehicle further includes a radio communication unit for communicating by radio with a radio communication device external to the vehicle, and
said indication system further comprises an indication control unit for changing a manner of indication by said second indication unit depending on whether communication by said radio communication unit is possible or not.

* * * * *

UNITED STATES PATENT AND TRADEMARK OFFICE
CERTIFICATE OF CORRECTION

PATENT NO. : 8,896,434 B2
APPLICATION NO. : 13/522574
DATED : November 25, 2014
INVENTOR(S) : Shinji Ichikawa It is certified that error appears in the above-identified patent and that said Letters Patent is hereby corrected as shown below:

In the Specification

In column 1, line 5, change PCT/JP2010/05478" to -- PCT/JP2010/050478 --.

Signed and Sealed this
Eighth Day of September, 2015

Michelle K. Lee
*Director of the United States Patent and Trademark Office*